United States Patent
Aaron

(10) Patent No.: US 8,116,751 B2
(45) Date of Patent: Feb. 14, 2012

(54) METHODS, SYSTEMS, AND PRODUCTS FOR IDENTITY VERIFICATION

(75) Inventor: Jeffrey A. Aaron, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 642 days.

(21) Appl. No.: 11/710,319

(22) Filed: Feb. 23, 2007

(65) Prior Publication Data

US 2008/0207220 A1 Aug. 28, 2008

(51) Int. Cl.
*H04M 3/42* (2006.01)
(52) U.S. Cl. .......... 455/415; 455/404.2; 455/456.1; 455/456.3
(58) Field of Classification Search ............ 455/420, 455/456.1, 466; 704/246, E17
See application file for complete search history.

(56) References Cited

U.S. PATENT DOCUMENTS

| | | | |
|---|---|---|---|
| 5,572,221 A * | 11/1996 | Marlevi et al. | 342/452 |
| 6,405,213 B1 | 6/2002 | Layson | |
| 6,725,127 B2 | 4/2004 | Stevens | |
| 2003/0151524 A1* | 8/2003 | Clark | 340/870.07 |
| 2004/0239508 A1 | 12/2004 | Kaneko | |
| 2006/0020459 A1* | 1/2006 | Carter et al. | 704/246 |
| 2006/0183486 A1 | 8/2006 | Mullen | |
| 2006/0208857 A1 | 9/2006 | Wong | |
| 2006/0223518 A1 | 10/2006 | Haney | |
| 2007/0082706 A1 | 4/2007 | Campbell et al. | |
| 2007/0087834 A1 | 4/2007 | Moser et al. | |
| 2007/0208861 A1 | 9/2007 | Zellner et al. | |
| 2007/0268138 A1 | 11/2007 | Chung et al. | |
| 2008/0032719 A1* | 2/2008 | Rosenberg | 455/466 |
| 2008/0157966 A1 | 7/2008 | Danvir et al. | |

* cited by examiner

*Primary Examiner* — Dwayne Bost
*Assistant Examiner* — Inder Mehra
(74) *Attorney, Agent, or Firm* — Scott P. Zimmerman PLLC

(57) ABSTRACT

Methods, systems, and products are disclosed for identification verification. Location information is acquired. The location information is compared to historical location information. When the location information favorably compares to the historical location information, then an identity associated with the location information is verified.

20 Claims, 9 Drawing Sheets

METHODS, SYSTEMS, AND PRODUCTS FOR IDENTITY VERIFICATION

COPYRIGHT NOTIFICATION

A portion of the disclosure of this patent document and its attachments contain material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND

The exemplary embodiments generally relate to communications and, more particularly, to location monitoring.

Identity theft is a problem. Each year identity fraud costs consumers and merchants billions of dollars. Conventional schemes to verify identity require knowledge information (e.g., usernames and passwords), physical attributes (e.g., fingerprint match, retina match, or other biometric measures), or physical possession (e.g., car keys). These conventional approaches are well known and are commonly referred to as verification using "what you know," "what you are," and "what you have." Because identity theft is, unfortunately, almost routinely common, additional measures of identity could be enormously beneficial. What is needed, then, are methods, systems, and products that describe a new paradigm in identity verification.

SUMMARY

The exemplary embodiments provide methods, systems, and products for verifying a person's identity. Exemplary embodiments utilize location to verify a person's identity. That is, exemplary embodiments verify a person's identity based on recurring patterns of movement. Because most people have a recurring commute to work, school, or other destination, exemplary embodiments use these recurring travel patterns to verify a person's identity. Most people are creatures of habit, including the everyday places we visit, such as work, restaurants, and shopping. Exemplary embodiments thus obtain location information that describes our daily travels. This location information (such as GPS information) may be obtained from wireless phones, laptop computers, automotive control modules, electronic PDAs, and any other devices. Whenever identity verification is needed, exemplary embodiments compare recent location information to historical location information. When the comparison is favorable, exemplary embodiments may verify the identity of the user of the device. When the comparison is unfavorable, the user may need to present a driver's license or other proof of identity. Exemplary embodiments thus authenticate users based on location. Embodiments, at least some respects, might be referred to as utilizing "where you have been" and any information related to "where you have been."

Exemplary embodiments include a method for identification verification. Location information is acquired. The location information is compared to historical location information. When the location information favorably compares to the historical location information, then an identity associated with the location information is verified.

More exemplary embodiments include a system for verifying a user's identity. Location information is acquired. The location information is compared to historical location information. When the location information favorably compares to the historical location information, then an identity associated with the location information is verified.

Other exemplary embodiments describe a computer program product for verifying a user's identity. Location information is acquired. The location information is compared to historical location information. When the location information favorably compares to the historical location information, then an identity associated with the location information is verified.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
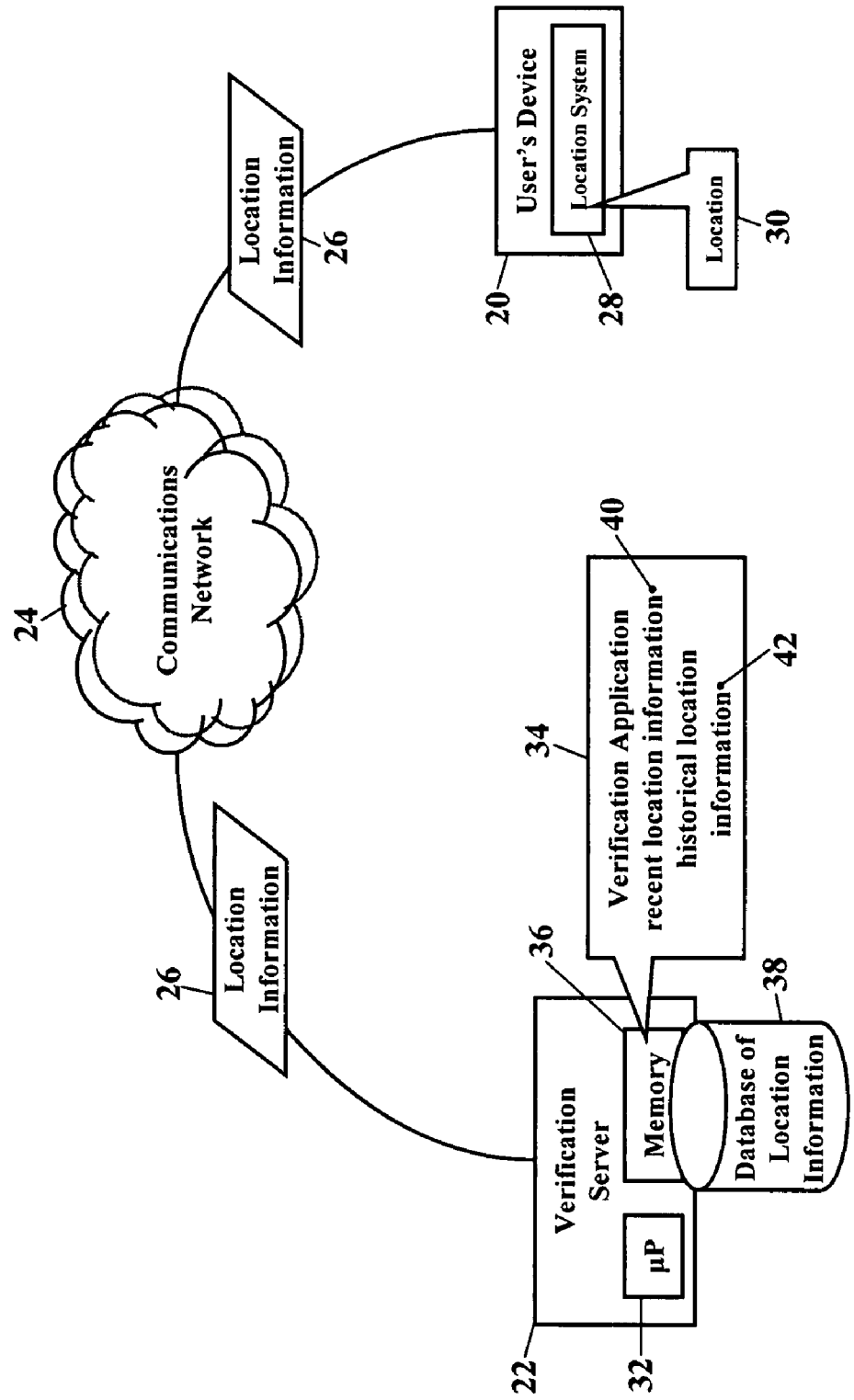
FIG. 1 is a schematic illustrating an operating environment in which exemplary embodiments may be implemented.

FIG. 1 is a schematic illustrating an environment in which exemplary embodiments may be implemented. A user's device 20 communicates with a verification server 22 via a communications network 24. Although the user's device 20 is generically shown, the device 20, as will be later explained, may be a computer, a radio, a personal digital assistant (PDA), a cordless/cellular/IP phone, digital music player, or any other processor-controlled device. Whatever the user's device 20, the user's device 20 communicates location information 26 to the verification server 22. As the user carries the device 20, a location system 28 determines or monitors a current location 30 of the user's device 20. According to exemplary embodiments, the location system 28 communicates the location information 26 to the verification server 22, and the location information 26 describes the current location 30 associated with the user's device 20.

When the verification server 22 receives the location information 26, exemplary embodiments verify the identity of the user of the device 20 based on the location information 26. The verification server 22 has a processor 32 (e.g., "µP"), application specific integrated circuit (ASIC), or other similar device that executes a verification application 34 stored in memory 36. According to exemplary embodiments, the verification application 34 is a set of processor-executable instructions that verify the identity of the user of the device 20, based on historical location information and/or patterns of movement. As FIG. 1 illustrates, the location information 26 may be stored in a database 38 of location information. The database 38 of location information is illustrated as being locally stored in the memory 36 of the verification server 22, yet the database 38 of location information may be remotely accessible via the communications network 24. The database 38 of location information historically stores or tracks location information for the user's device 20. The database 38 of location information, for example, may store location information for the previous hour, for the current day, for the past month, for the past year, or for any interval or length of time desired. The database 38 of location information thus provides the verification application 34 with data to completely analyze historical location information of the user's device 20. The database 38 of location information also allows the verification application 34 to analyze a series or chronological series of location information, or movements, of the user's device 20.

According to exemplary embodiments, location information may include any information related to location. Location information, for example, may describe a current location, a past location, and one or more sequences of locations. Location information may include sets of two or more locations that may be associated in any way (e.g., schools, residences of neighbors, malls, theaters, parks, stores, and chains of stores). Location information may describe any time spent at particular locations, such as past locations, movement patterns, or any aspects of movement patterns. Location information may even include any information derived from location and/or time measurements, such as velocity (changes in location over time) and acceleration (changes in velocity over time). Location information may further include one or more sequences of locations. If a sequence is chronologically arranged, then the location information may describe a movement, travel pattern, or route observed over time. Location information may also include sets of two or more locations, and those locations may be associated (for example, schools, neighbors, residences, stores, and store chains such as HOME DEPOT® and TARGET®). Location information may even include time parameters, such as the time spent at a particular location, including past locations.

The identity of the user may be verified using the location information 26. According to exemplary embodiments, the verification application 34 queries the database 38 of location information for recent and/or for historical location information. The verification application 34 then compares recent location information 40 to historical location information 42. When the recent location information 40 favorably compares to the historical location information 42, then the verification application 34 may verify the identity of the user of the device 20. Because the user's recent movements match historical location information, the verification application 34 may assume that the user is the historical user of the device 20. That is, the user is moving or traveling as expected because the device 20 is not sending new or unrecognized location information 26. Because the recent location information 40 matches historical data, there is a higher probability that the current user is the same person that accumulated the historical location information 42.

Exemplary embodiments, then, verify a user's identity based on location. Many people have repeatable travel patterns and/or destinations. The user, for example, may make a daily commute to/from work, school, or shopping. The user may frequently or repeatedly visit a relative, friend, restaurant, or business. The user may have a regular jogging route or exercise course. Whatever the destination or route, when that corresponding location information is received, the user is making the same travels as historically observed. There is thus a higher probability that the current user is the same historical user that accumulated the historical travels, and so the identity of the current user may be verified. Conversely, when the location information 26 unfavorably compares to the historical location information 42, then exemplary embodiments may decline to verify the identity of the user of the device 20. The device 20 is not traveling as historically observed, so the identity of the current user may or may not match the historical user. As later paragraphs will explain, the verification application 34 may be completely configured to determine favorable and unfavorable comparisons.

Exemplary embodiments may utilize any location system. The location system 28 may utilize any technique for obtaining the current location 30 of the user's device 20, such as triangulation and/or global positioning system information. While the location system 28 is shown residing or operating in the user's device 20, the location system 28 may optionally operate within the verification server 22. Moreover, the location system 28 may alternatively or additionally be a service provided by a separate server and accessible via the communications network 24. Further, the location system 28 may alternately or additionally be an external system such as based on one or more cameras and/or other sensors appropriately situated and configured to recognize the user and/or the device 20 and/or one or more associated or associable objects. Because, however, location systems are well known to those of ordinary skill in the art, no further discussion is made.

The verification server 22 is only simply illustrated. Because the architecture and operating principles of the verification server 22 are well known, its hardware and software components are not further shown and described. If the reader desires more details, the reader is invited to consult the following sources, all incorporated herein by reference in their entirety: ANDREW TANENBAUM, COMPUTER NETWORKS ($4^{th}$ edition 2003); WILLIAM STALLINGS, COMPUTER ORGANIZATION AND ARCHITECTURE: DESIGNING FOR PERFORMANCE ($7^{th}$ Ed., 2005); and DAVID A. PATTERSON & JOHN L. HENNESSY, COMPUTER ORGANIZATION AND DESIGN: THE HARDWARE/SOFTWARE INTERFACE ($3^{rd}$. Edition 2004).

Exemplary embodiments may be applied regardless of networking environment. The communications network 24 may be a cable network operating in the radio-frequency domain and/or the Internet Protocol (IP) domain. The communications network 24, however, may also include a distributed computing network, such as the Internet (sometimes alternatively known as the "World Wide Web"), an intranet, a local-area network (LAN), and/or a wide-area network (WAN). The communications network 24 may include coaxial cables, copper wires, fiber optic lines, and/or hybrid-coaxial lines. The communications network 24 may even include wireless portions utilizing any portion of the electromagnetic spectrum and any signaling standard (such as the I.E.E.E. 802 family of standards, GSM/CDMA/TDMA or any cellular standard, and/or the ISM band). The concepts described herein may be applied to any wireless/wireline communications network, regardless of physical componentry, physical configuration, or communications standard(s).

Figure 2:
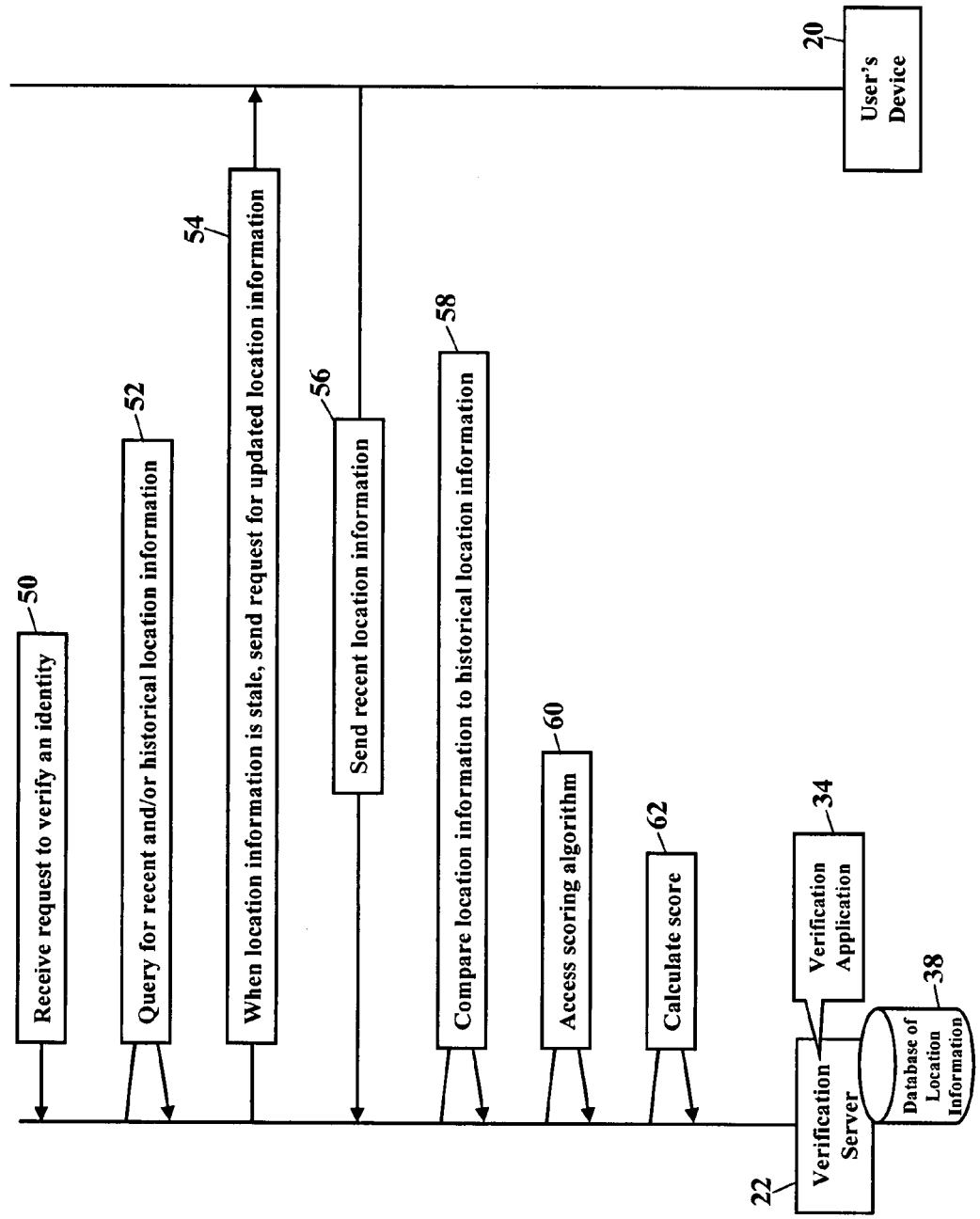
FIGS. 2 & 3 are schematics illustrating a process of verifying a user's identity, according to more exemplary embodiments.
Figure 3:
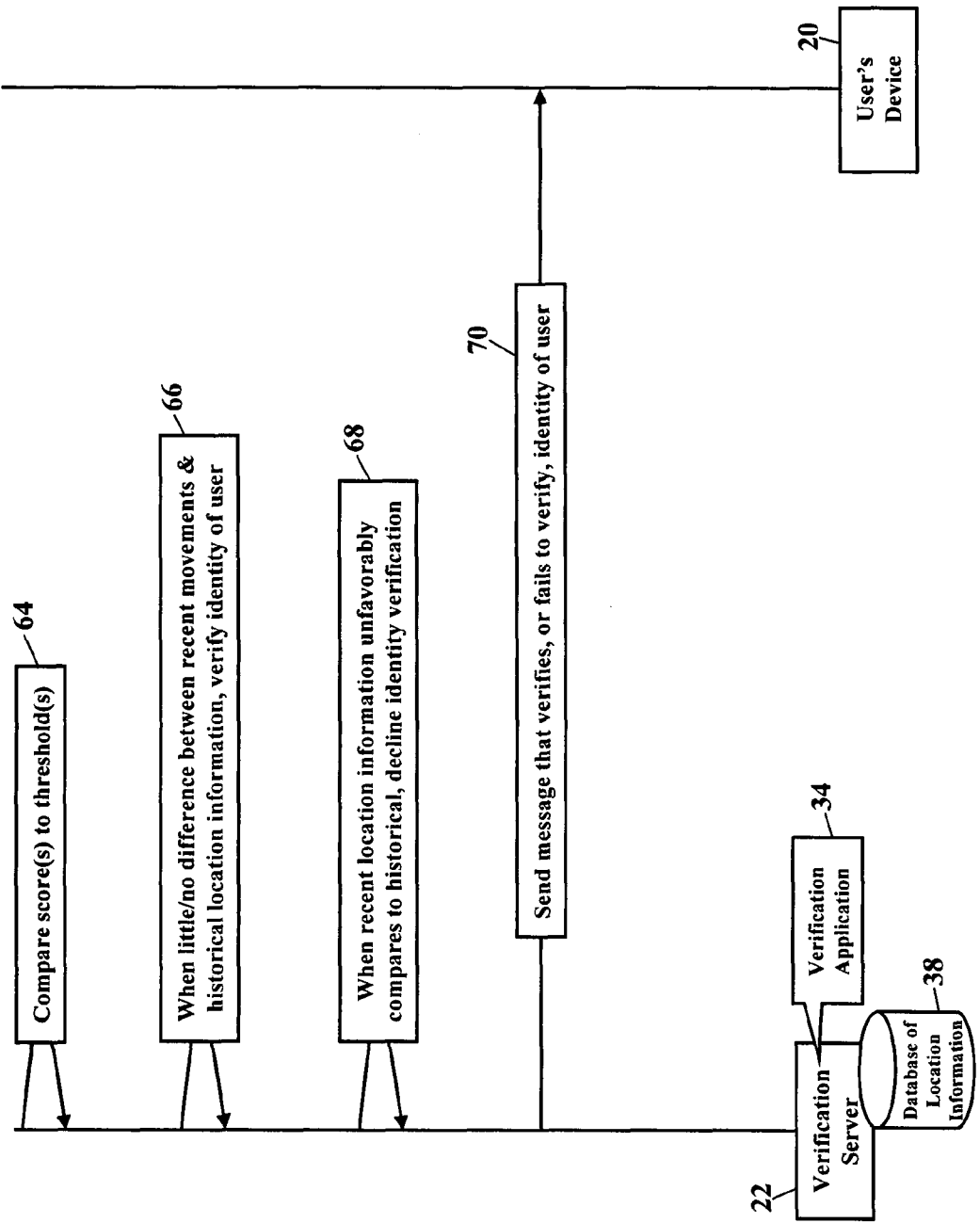

FIGS. 2 and 3 are schematics illustrating a process of verifying a user's identity, according to more exemplary embodiments. Here the verification application 34 may calculate a score when comparing the recent location information 40 to the historical location information 42. As FIG. 2 illustrates, the verification server 22 may first receive a request to verify an identity (Step 50). The request may originate from any person, such as a third party restaurant, business, or other merchant that wishes to verify the user of the device 20. The request, additionally or alternatively, may be automatically generated by the device 20 and/or the verification server 22 to enable or ensure periodic verifications and/or to ensure that recent verifications are always available. When the verification server 22 receives the request, the verification application 34 may query for recent and/or historical location information (Step 52). When the location information is stale (that is, older than some predetermined time), the verification application 34 may send a request for updated location information (Step 54). The device 20 responds and sends current or recent location information (Step 56). The verification application 34 compares the recent location information to the historical location information (Step 58).

The verification application 34 accesses a scoring algorithm (Step 60). The scoring algorithm numerically evaluates how well the recent movements of the device 20 match the historical location information, as defined by the scoring algorithm. The scoring algorithm may be any simple or complex formula, relationship, pattern matching process, string equation, or logical comparison. The scoring algorithm, however, may have any structure and/or language, such as MathML or OpenMath. In addition, the third party requestor may supply the scoring algorithm in the form of mobile executable code (e.g., Java byte code). The third party requestor may thus specify the scoring algorithm, thus allowing the requestor to determine how strictly the current user's identity is verified. The complexity of the third party's scoring algorithm, however, may be restricted to not substantially hinder the performance of the verification application 34 or the verification server 22 itself. So the verification application 34 may inspect the scoring algorithm and estimate its complexity. The verification application 34 may measure the bit or byte length of the scoring algorithm and compare to a threshold size. The verification application 34 may inspect the scoring algorithm for terms, mathematical operations/operands, or mathematical functions that indicate complexity. If such indicators are found, the verification application 34 could reject the third party's scoring algorithm. The verification application 34 may even utilize multiple scoring algorithms and select one or more of the outcomes.

Whatever the scoring algorithm, the verification application 34 calculates a score (Step 62). The score is a measure of identity. If multiple scoring algorithms are used, a score may be calculated for each algorithm. The best score(s) may be chosen for identity verification, or the multiple scores may be combined and/or weighted to produce an overall, final score.

The process continues with FIG. 3. The verification application 34 may compare the score(s) to one or more threshold scores (Step 64). The threshold score may represent a necessary score at which the identity of the user may be verified. When the recent movements match the historical location information, then the score may indicate the user matches the historical user. If there is little or no difference between the recent movements and the historical location information, then the threshold score may be satisfied and the identity of the user is verified (Step 66). When the location information unfavorably compares to the historical location information, then the threshold score may not be satisfied and the verification application 34 may decline to verify the identity of the user of the device (Step 68). The verification application 34 may then send a message to the device 20 that verifies, or fails to verify, the identity of the user (Step 70). The verification application 34 may additionally or alternatively send the message to the third party requestor.

The threshold score may be configurable. The threshold score represents some configurable score that is required to verify the identity of the user. The threshold score is preferably stored in the memory 36 of the verification server 22, but the threshold score may be remotely accessed (via the communications network 24 shown in FIG. 1). The threshold score may even be supplied by the verification requestor (e.g., a third party merchant). A user of the device 20, for example, may establish a strict threshold score so that even slight variations (between the recent movements and the historical location information) result in a failed verification. A more lax threshold score may verify the user despite location differences. Similarly, the third party requestor may specify a strict threshold score to reduce the chances of fraudulent purchases, transactions, and other activities.

Figure 4:
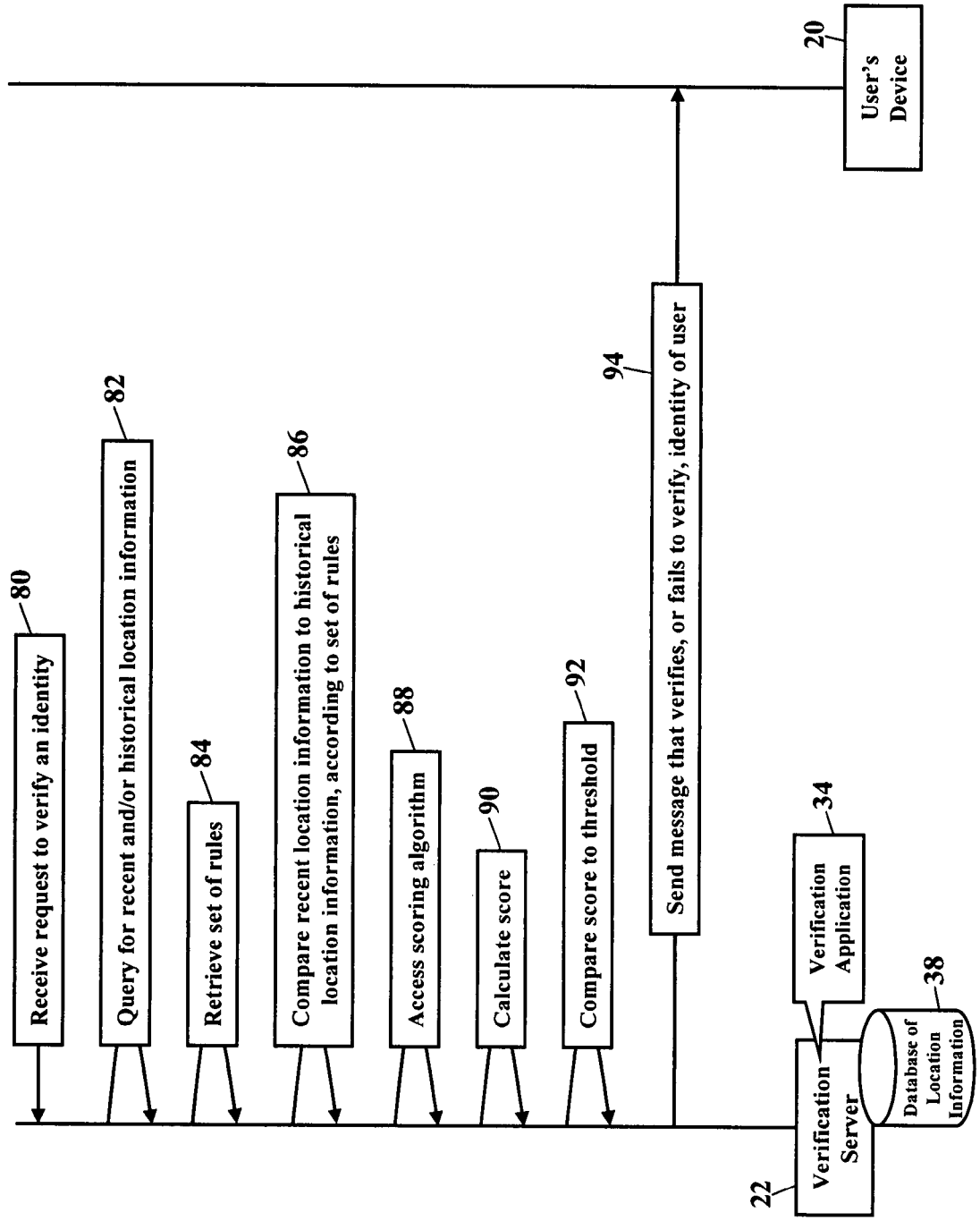
FIG. 4 is a schematic illustrating another process of verifying a user's identity, according to even more exemplary embodiments.

FIG. 4 is a schematic illustrating another process of verifying a user's identity, according to even more exemplary embodiments. Here the verification application 34 may access rules that determine how strictly the location information is compared to the historical location information. The verification server 22 again receives a request to verify an identity (Step 80). The verification application 34 queries for recent and/or historical location information (Step 82). The verification application 34 retrieves a set of rules (Step 84) and compares the recent location information to the historical location information, according to the set of rules (Step 86). The verification application 34 may access the scoring algorithm (Step 88), calculate the score (Step 90), and compare the score to the threshold score (Step 92). The verification application 34 may then send a message that verifies, or fails to verify, the identity of the user (Step 94).

According to exemplary embodiments, the set of rules defines how recent location information is compared to the historical location information. The set of rules may be stored in the memory 36 of the verification server 22, yet the set of rules may be remotely accessed (via the communications network 24 shown in FIG. 1). The set of rules may also be supplied by the verification requestor (e.g., attached to or specified by the verification request illustrated as Step 80 in FIG. 4). The set of rules, for example, may establish a logical comparison of location information for one or more different intervals of time. Location information is retrieved for each specified interval of time, and then the location information is compared. The verification application 34 may compare individual locations (or "waypoints"), or the verification application 34 may compare routes (e.g., a series of locations or waypoints). The verification application 34 may additionally or alternatively compare the time spent at locations and/or en routes. Whatever interval(s) of time are specified, the verification application 34 gathers the corresponding location information, according to the set of rules.

The set of rules may specify two different intervals of time. The set of rules, for example, may specify that the verification application 34 compare the previous week's location information to the past ten weeks of the historical location information. A first interval of time, then, would represent the previous seven days, while a second interval of time would represent the previous seventy days. The verification application 34 collects location information for the previous seven days and for the previous seventy days. The previous week's location information is then compared to the past ten weeks of the historical location information. The set of rules may specify any interval or length of time in any unit of measurement (e.g., seconds, minutes, hours, days, weeks, months, years). In some implementations, the comparison of a shorter interval with a longer interval may include comparing the shorter interval to multiple instances of similar intervals existing within the longer interval.

The set of rules may also specify particular dates. The set of rules, for example, may specify that location information for Monday and Tuesday is compared with the previous two weeks of historical location information. The set of rules may specify that location information for Monday and Tuesday is compared to historical location information for each Monday and Tuesday during the previous six months. The set of rules may specify that location information for today from noon to 6 PM is compared to historical location information for each previous noon to 6 PM over the last four months. The set of rules, in short, may specify different intervals of time by date(s).

The set of rules may also specify a strict or lax comparison. The set of rules, for example, may specify that the same location must be observed in all specified intervals of time. The set of rules may more strictly require that the same location be observed at the same or nearly same time in each interval of time. The set of rules may strictly require the same route (e.g., the same series of location information) be observed for each interval of time. If the user historically takes the same route, then the set of rules may specify that that same route be observed to verify the user's identity. If the user historically has the same historical location information for each Tuesday of the previous months, then the set of rules may require that same location information on any Tuesday in order to verify the user's identity.

The set of rules may specify acceptable variation in location information. When the current location information is compared to the historical location information, the set of rules may limit how much difference is acceptable. The set of rules, for example, may strictly require an exact match in location information, within the accuracy of the location system (shown as reference numeral 28 in FIG. 1). The set of rules may even strictly require an exact match in location information and in the time of each observed location. An exact match requirement, however, may result in excessive denials of identity. The set of rules, then, may specify a threshold radius of variation, in which current location information may be approximately matched to the historical location information. If any location information is within the threshold radius of the historical location information, then the verification application 34 may verify the user's identity. According to exemplary embodiments, the threshold radius of variation is completely configurable and may be pre-figured and/or specified by the user and/or the verification requestor. The set of rules, verification algorithms, and the threshold radius of variation may be made adaptable based on adaptation rules and parameters such as the month, week, day of week, time of day, frequency of verification requests, and/or frequency of verification denials. The set of rules may even define multiple logical comparisons and/or multiple scoring algorithms, and, according to embodiments, one or more must be matched or satisfied within the allowable threshold radius of variation. In some cases, for instance when employing multiple algorithms, multiple thresholds and/or multiple threshold radii of variation may be used.

The set of rules may also access a geographical information system or database. When the verification application 34 compares current location information to the historical location information, geographical information may be used to augment that comparison. The verification application 34, for example, may tolerate more variation in location information when the geographical information indicates hilly, forested, or even mountainous terrains. In such terrains, for instance, GPS location fixes may sometimes suffer in accuracy due to increased difficulty of receiving the required GPS satellite signals. The location information may even be more accurate in some terrains than in others, so the set of rules may require greater accuracy in some terrains. The geographical information may be stored in the memory 36 of the verification server 22, or the geographical information may be remotely stored in a remote database and accessed via the communications network 24. Geographical information, then, may be used to help compare location information and overcome or evaluate ambiguities, errors, and imprecision.

Figure 5:
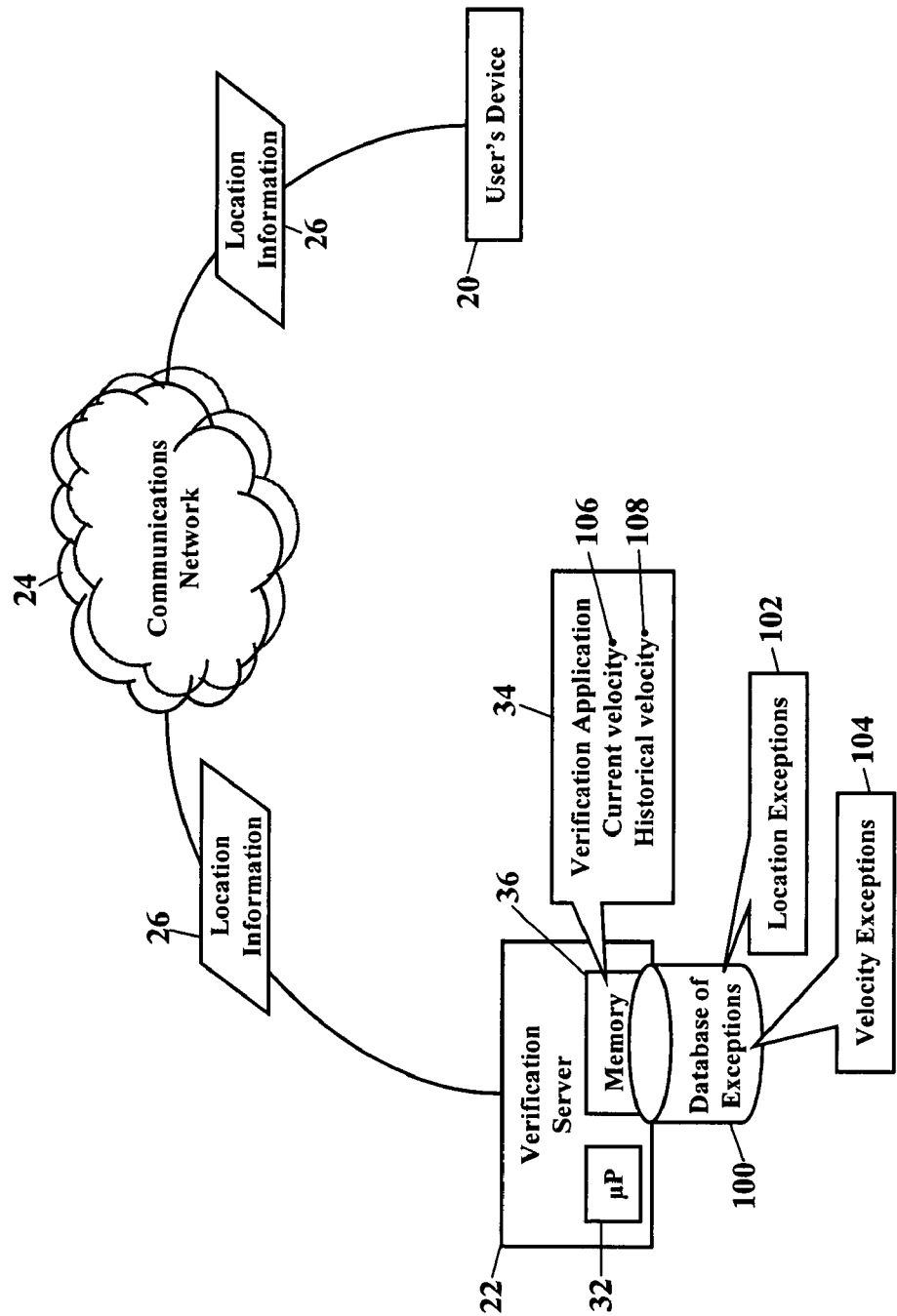
FIG. 5 is a schematic illustrating exceptions, according to even more exemplary embodiments.

FIG. 5 is a schematic illustrating exceptions, according to even more exemplary embodiments. Here exemplary embodiments may automatically decline to verify a user. When the verification application 34 receives the location information 26, the verification application 34 may query a database 100 of exceptions for the location information 26. The database 100 of exceptions stores forbidden location exceptions 102 for which verification is immediately and automatically denied. That is, if the location information 26 matches any entry in the database 100 of exceptions, then the user and/or the requestor requires immediate denial of identity verification. The database 100 of exceptions thus stores location information for which a legitimate, verified user would never be found/observed. Pornographic stores, private clubs, restricted access locations, remote islands, or any other locations at which the user should not be observed. When the verification application 34 receives an affirmative response from the database 100 of exceptions, then the verification application 34 denies identity verification.

FIG. 5 also illustrates velocity exceptions 104. The verification application 34 may receive, or calculate, changes in location over time (e.g., velocity). The verification application 34 may then compare a current velocity 106 to an historical velocity 108. When the current velocity 106 is faster or slower than the historical velocity 108 (perhaps over the same route), then the verification application 34 may have authority to deny verification. Moreover, the database 100 of exceptions stores velocities 104 for which verification is immediately and automatically denied. That is, if the current velocity 106 is greater than the historical velocity 108, then an imposter may have obtained the device 20. If the legitimate, historical user consistently drives twenty five miles per hour in a school zone, and the current velocity 106 is forty miles per hour, then an imposter may have obtained the device 20. If the legitimate, historical user would never fly in an airplane, and the current velocity 106 is over 80 miles per hour, then an imposter may have obtained the device 20. When the verification application 34 calculates velocity and receives an affirmative response from the database 100 of exceptions, then the verification application 34 may deny identity verification.

Figure 6:
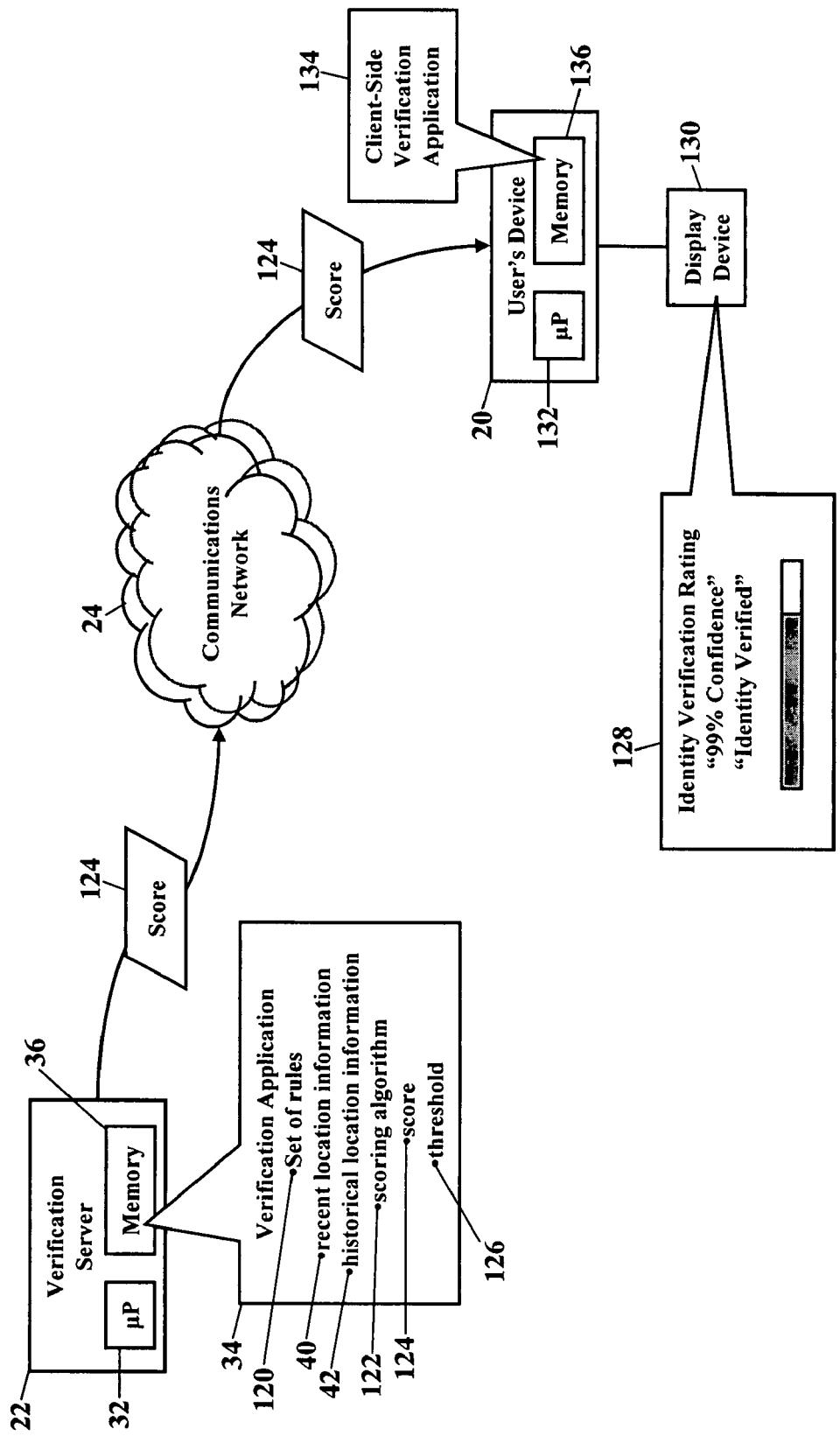
FIG. 6 is a schematic illustrating presentation of an identity verification rating, according to still more exemplary embodiments.

FIG. 6 is a schematic illustrating presentation of an identity verification rating, according to still more exemplary embodiments. Here, when the verification application 34 scores the user's identity (based on location), the verification application 34 sends that score and/or an appropriately calculated rating based on that score to the user's device 20. The verification application 34 retrieves a set 120 of rules and compares the recent location information 40 to the historical location information 42. The verification application 34 may access the scoring algorithm 122, calculate a score 124, and compare the score 124 to the threshold score 126. The verification application 34 then sends the score 124 to the user's device 20. The rating may be determined from the score if, for example, the scale of the score varies by algorithm. The score or rating may be scaled or configured to be within the range of "0" to "100," with greater numbers having more confidence.

The user's device 20 presents an identity verification rating 128. The identity verification rating 128 is illustrated as an icon or notification that is visually presented on a display device 130 of the user's device 20, yet the identity verification rating 128 may also have audible features. The user's device 20 has a processor 132 (e.g., "μP"), application specific integrated circuit (ASIC), or other similar device that executes a client-side verification application 134 stored in memory 136. The client-side verification application 134 is a set of processor-executable instructions that cooperate with the verification application 34 (operating in the verification server 22) to verify the identity of the user of the device 20. The client-side verification application 134 instructs the processor 132 to receive the score 124 and to present the identity verification rating 128. The identity verification rating 128, for example, may be a numerical presentation or bar graph of the score 124 (e.g. a probability or confidence level). The identity verification rating 128, however, may be a simple "green" icon that indicates the user has been verified. A "red" icon may indicate that the current user is an imposter and that verification is or should be denied. The "red" icon may be accompanied by an alert, such as an audible chirp or siren sound, flashing beacon, and/or loud synthesized voice declaration (such as "This device has been stolen; bystanders please notify the police at once!"). The identity verification rating 128 may be any graphical, audible, or visual indicator of the user's identity verification.

The identity verification rating 128 may be proof of identity. Because the identity verification rating 128 is visually produced at the user's device 20, the user may thus present the device 20 as verification of identity. Whenever a merchant, for example, requires identity verification, the user may simply and quickly produce the device 20 with the identity verification rating 128 presented on the display device 130. The identity verification rating 128 may even additionally retrieve a name, address, and driver's license number from the memory 136, and the identity verification rating 128 may additionally present this and/or any other suitable information. When the identity verification rating 128 is high, for example, the merchant may confidently accept the user's identity. When, however, the verification application 34 sees unusual or even suspicious location information, the identity verification rating 128 may drop or change in value, so the merchant may be reluctant to verify the identity of the user. Additional identification, such as a physical driver's license or social security card, may then be desired and/or specifically required by the merchant.

Figure 7:
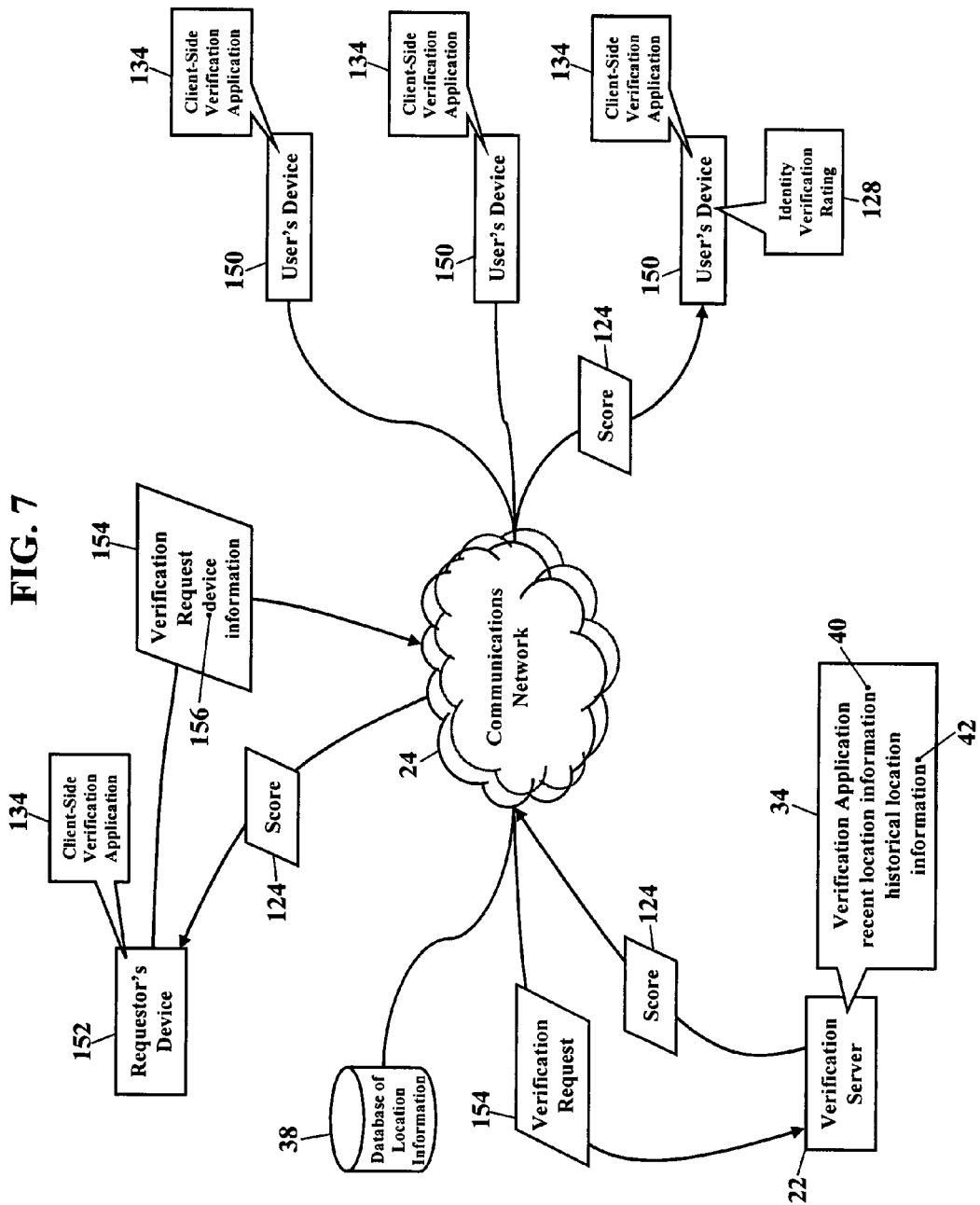
FIG. 7 is a schematic illustrating an alternative, centralized operating environment, according to more exemplary embodiments.

FIG. 7 is a schematic illustrating an alternative, centralized operating environment, according to more exemplary embodiments. Here the verification server 22 communicates with multiple user devices 150 via the communications network 24. The verification server 22 also communicates with one or more third party requestor's devices 152 via the communications network 24. The verification application 34 operates in the centralized verification server 22. An instance of the client-side verification application 134 operates in each of the users' devices 150. An instance of the client-side verification application 134 may also operate in the third party requestor's device 152. The verification application 34 may continuously or periodically verify the identity of any user of the user devices 150. Alternatively or additionally, whenever a third party (such as a merchant) desires to verify the identity of a user, the third party's corresponding device 152 may send a verification request 154. The verification request 154 includes device information 156 that uniquely identifies the device for which identity verification is desired. The device information 156, for example, may include a machine address code, a serial number, an Internet Protocol address, or any other alphanumeric combination. When the verification application 34 receives the verification request 154, the verification application 34 queries the database 38 of location information for the current location information 40 and for the historical location information 42. Here the database 38 of location information is illustrated as being remotely accessible via the communications network 24. The verification application 34 compares the current location information 40 with the historical location information 42 and scores the user's identity (as explained with reference to FIGS. 1-6). The verification application 34 sends the score 124 to the corresponding user's device 20 and/or to the third party's requesting device 152. The user's device 20 may then visually and/or audibly present the identity verification rating 128, as above explained. The verification application 34 may additionally or alternatively send the score 124 to other devices associated with (or selected by) the historic user of the device 20.

Figure 8:
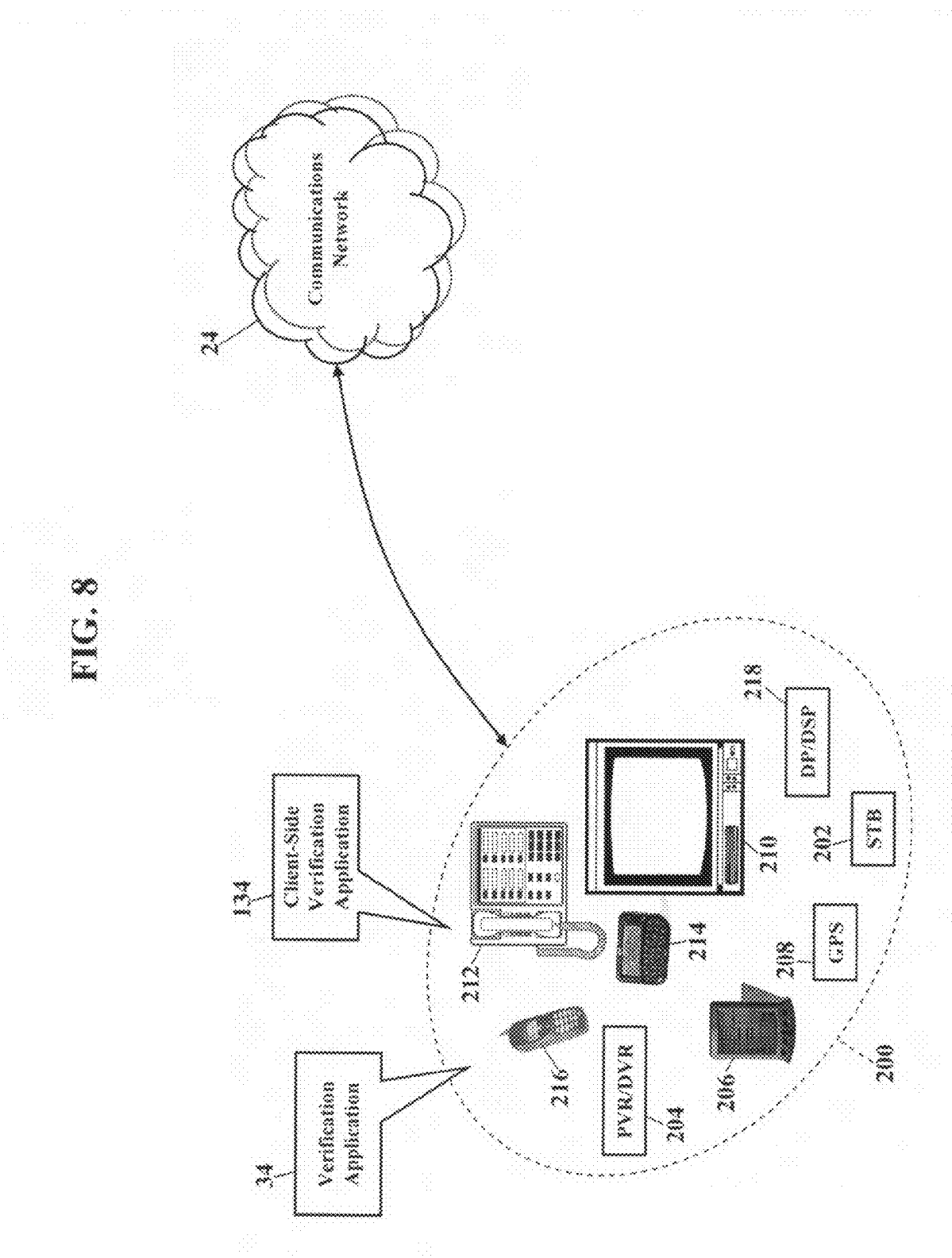
FIG. 8 depicts other possible operating environments for additional aspects of the exemplary embodiments.

FIG. 8 depicts other possible operating environments for additional aspects of the exemplary embodiments. FIG. 8 illustrates that the verification application 34 and/or the client-side verification application 34 may alternatively or additionally operate within various other devices 200. FIG. 8, for example, illustrates that the verification application 34 and/or the client-side verification application 34 may entirely or partially operate within a set-top box (202), a personal/digital video recorder (PVR/DVR) 204, personal digital assistant (PDA) 206, a Global Positioning System (GPS) device 208, an interactive television 210, an Internet Protocol (IP) phone 212, a pager 214, a cellular/satellite phone 216, or any computer system and/or communications device utilizing a digital processor and/or a digital signal processor (DP/DSP) 218. The device 200 may also include watches, radios, vehicle electronics, clocks, printers, gateways, mobile/implantable medical devices, and other apparatuses and systems. Because the architecture and operating principles of the various devices 200 are well known, the hardware and software componentry of the various devices 200 are not further shown and described. If, however, the reader desires more details, the reader is invited to consult the following sources, all incorporated herein by reference in their entirety: LAWRENCE HARTE et al., GSM SUPERPHONES (1999); SIEGMUND REDL et al., GSM AND PERSONAL COMMUNICATIONS HANDBOOK (1998); and JOACHIM TISAL, GSM CELLULAR RADIO TELEPHONY (1997); the GSM Standard 2.17, formally known *Subscriber Identity Modules, Functional Characteristics* (GSM 02.17 V3.2.0 (1995-01))"; the GSM Standard 11.11, formally known as *Specification of the Subscriber Identity Module—Mobile Equipment (Subscriber Identity Module—ME) interface* (GSM 11.11 V5.3.0 (1996-07))"; MICHEAL ROBIN & MICHEL POULIN, DIGITAL TELEVISION FUNDAMENTALS (2000); JERRY WHITAKER AND BLAIR BENSON, VIDEO AND TELEVISION ENGINEERING (2003); JERRY WHITAKER, DTV HANDBOOK (2001); JERRY WHITAKER, DTV: THE REVOLUTION IN ELECTRONIC IMAGING (1998); and EDWARD M. SCHWALB, iTV HANDBOOK: TECHNOLOGIES AND STANDARDS (2004).

Figure 9:
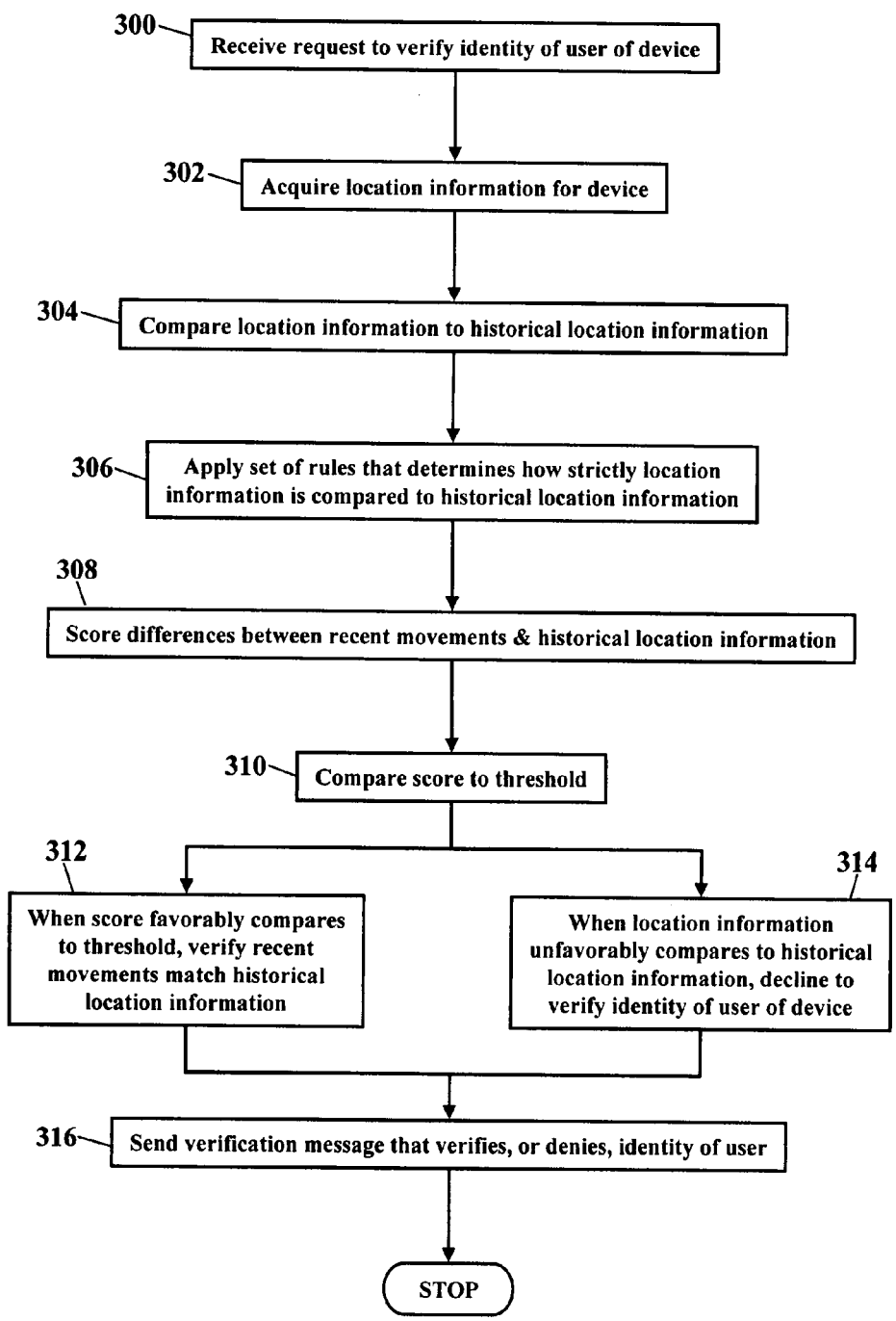
FIG. 9 is a flowchart illustrating a method of verifying identity, according to even more exemplary embodiments.

FIG. 9 is a flowchart illustrating a method of verifying identity, according to even more exemplary embodiments. A request to verify the identity of a user of a device is received (Block 300). Location information for a device is acquired (Block 302). The location information is compared to historical location information (Block 304). A set of rules is applied that determines how strictly the location information is compared to the historical location information (Block 306). Any differences between recent movements and the historical location information are scored (Block 308). The score is compared to a threshold (Block 310). When the score favorably compares to the threshold, then verify that the recent movements of the user match the historical location information (Block 312). When the location information unfavorably compares to the historical location information, then decline to verify the identity of the user of the device (Block 314). A verification message is sent that verifies, or denies, the identity of the user (Block 316).

Exemplary embodiments may be physically embodied on or in a transitory or non-transitory computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000). This computer-readable medium, or media, could be distributed to end-subscribers, licensees, and assignees. These types of computer-readable media, and other types not mention here but considered within the scope of the exemplary embodiments. A computer program product comprises processor-executable instructions for verifying identity.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method of verifying identity, comprising:
   acquiring recent global positioning system location information for a device;
   chronologically arranging the recent global positioning system information to describe a route;
   querying a database that associates the device to historical routes;
   retrieving a historical route from the database;
   comparing the recent global positioning system location information to the historical route;
   determining the route matches the historical route; and
   verifying the identity of a current user of the device based on a match between the route and the historical route.

2. The method according to claim 1, further comprising scoring a difference between the route and the historical route.

3. The method according to claim 2, further comprising comparing the score to a threshold.

4. The method according to claim 3, wherein when the score equals or exceeds the threshold, then verifying that the route matches the historical route.

5. The method according to claim 1, further comprising sending a verification message that verifies the identity.

6. The method according to claim 1, further comprising receiving a request to verify the identity.

7. The method according to claim 1, wherein when the route does not match the historical route, then declining to verify the identity.

8. The method according to claim 1, further comprising applying a set of rules that determines how strictly the route is compared to the historical route.

9. A system for verifying identity, comprising:
   a processor executing code stored in memory that causes the processor to:
   receive a request to verify an identity of a user of a device;
   acquire recent global positioning system location information associated with the device;
   chronologically arrange the recent global positioning system information to describe a route;
   query a database that associates the device to historical routes;
   retrieve a historical route from the database;
   compare the route to the historical route;
   determine the route matches the historical route; and
   verify the identity of the user based on a match between the route and the historical route.

10. The system according to claim 9, further comprising code that causes the processor to:
    receive a scoring algorithm with the request; and
    compute a score from the scoring algorithm describing a comparison between the route and the historical route.

11. The system according to claim 10, further comprising code that causes the processor to compare the score to a threshold.

12. The system according to claim 11, wherein when the score equals or exceeds the threshold, then the code that causes the processor to verify the identity of the user associated with the device.

13. The system according to claim 9, further comprising code that causes the processor to send a verification message that verifies the identity in response to the request.

14. The system according to claim 9, further comprising code that causes the processor to receive multiple scoring algorithms with the request.

15. The system according to claim 9, wherein when the route does not match the historical route, then the code causes the processor to decline to verify the identity of the user.

16. The system according to claim 9, further comprising code that causes the processor to apply a set of rules that determines how strictly the route is compared to the historical route.

17. A non-transitory computer readable medium storing computer-readable instructions for performing a method of verifying identity, the method comprising:
   receiving a request to verify an identity of a user of a device;
   acquiring recent global positioning system location information associated with the device;
   chronologically arranging the recent global positioning system information to describe a route;
   querying a database that associates the device to historical routes;
   retrieving a historical route from the database;
   comparing the route to the historical route;
   determining the route matches the historical route; and
   verifying the identity of the user of the device based on a match between the route and the historical route.

18. The computer readable medium according to claim 17, further comprising instructions for scoring a difference between the route and the historical route.

19. The computer readable medium according to claim 18, further comprising instructions for comparing a score to a threshold.

20. The computer readable medium according to claim 19, further comprising instructions for:
   i) when the score equals or exceeds the threshold, then verifying the identity of the user, and
   ii) when the score is less than the threshold, then declining to verify the identity of the user.

* * * * *